(12) United States Patent
Roper

(10) Patent No.: US 9,759,350 B2
(45) Date of Patent: Sep. 12, 2017

(54) RISER DEFLECTION MITIGATION

(71) Applicant: Ensco International Incorporated, Wilmington, DE (US)

(72) Inventor: Richard Robert Roper, Katy, TX (US)

(73) Assignee: Ensco International Incorporated, Wilmington, DE (US)

( * ) Notice: Subject to any disclaimer, the term of this patent is extended or adjusted under 35 U.S.C. 154(b) by 0 days.

(21) Appl. No.: 15/092,787

(22) Filed: Apr. 7, 2016

(65) Prior Publication Data

US 2016/0298790 A1    Oct. 13, 2016

Related U.S. Application Data

(60) Provisional application No. 62/144,205, filed on Apr. 7, 2015.

(51) Int. Cl.
*F16L 1/12* (2006.01)
*E21B 17/01* (2006.01)

(52) U.S. Cl.
CPC .............. *F16L 1/123* (2013.01); *E21B 17/01* (2013.01); *E21B 17/017* (2013.01)

(58) Field of Classification Search
CPC combination set(s) only.
See application file for complete search history.

(56) References Cited

U.S. PATENT DOCUMENTS

| | | | |
|---|---|---|---|
| 3,717,113 A | 2/1973 | Wilde | |
| 4,078,605 A | 3/1978 | Jones | |
| 4,200,999 A * | 5/1980 | Latimer | B63B 21/663 114/243 |
| 6,179,524 B1 | 1/2001 | Allen et al. | |
| 9,511,825 B1 * | 12/2016 | Henning | B63B 21/663 |
| 2007/0104542 A1 * | 5/2007 | Somerville | B63B 21/663 405/224.1 |
| 2008/0131210 A1 * | 6/2008 | Wajnikonis | B63B 21/502 405/211 |
| 2014/0186179 A1 | 7/2014 | Lin | |

FOREIGN PATENT DOCUMENTS

| | | | | |
|---|---|---|---|---|
| NO | GB 2517309 A * | 2/2015 | | E21B 41/04 |
| WO | 2008021674 | 2/2008 | | |

OTHER PUBLICATIONS

PCT Application No. PCT/US2016/026431 PCT International Search Report and Written Opinion mailed Jul. 18, 2016.

* cited by examiner

*Primary Examiner* — Kyle Armstrong
(74) *Attorney, Agent, or Firm* — Fletcher Yoder, P.C.

(57) ABSTRACT

Techniques and systems to reduce deflection of a riser extending from offshore platform. A riser may include an outer enclosure. This outer enclosure may be coupled to a current deflector. The current deflector is configured to generate a lift on the riser in response to a fluid flowing across the current deflector. This lift that is generated by the current deflector may counteract currents or other factors to mitigate deflection in the riser.

20 Claims, 4 Drawing Sheets

RISER DEFLECTION MITIGATION

CROSS REFERENCE TO RELATED APPLICATIONS

This application is a Non-Provisional Application claiming priority to U.S. Provisional Patent Application No. 62/144,205, entitled "RISER DEFLECTION MITIGATION", filed Apr. 7, 2015, which is herein incorporated by reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Advances in the petroleum industry have allowed access to oil and gas drilling locations and reservoirs that were previously inaccessible due to technological limitations. For example, technological advances have allowed drilling of offshore wells at increasing water depths and in increasingly harsh environments, permitting oil and gas resource owners to successfully drill for otherwise inaccessible energy resources. To drill for oil and gas offshore, it is desirable to have stable offshore platforms and/or floating vessels from which to drill and recover the energy resources. Techniques to stabilize the offshore platforms and floating vessels include, for example, the use of mooring systems and/or dynamic positioning systems. However, these systems may not always adequately stabilize components descending from the offshore platforms and floating vessels to the seafloor wellhead.

For example, a riser string (e.g., a pipe or series of pipes that connects the offshore platforms or floating vessels to the floor of the sea) may be used to transport drill pipe, casing, drilling mud, production materials or hydrocarbons between the offshore platform or floating vessel and a wellhead. The riser is suspended between the offshore platform or floating vessel and the wellhead, and may experience forces, such as underwater currents, that cause deflection (e.g., bending or movement) in the riser. Acceptable deflection can be measured by the deflection along the riser, and also at, for example, select points along the riser. These points may be located, for example, at the offshore platform or floating vessel and at the wellhead. If the deflection resulting from underwater current is too great, drilling must cease and the drilling location or reservoir may not be accessible due to such technological constraints. Accordingly, it would be desirable to provide techniques to stabilize risers in offshore drilling and energy resource recovery environments.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Systems and techniques for stabilizing a riser extending from offshore platform, such as a drillship, a semi-submersible platform, a floating production system, or the like, are set forth below. In one embodiment, one or more foils (e.g., blades, wings, or the like) may be utilized to achieve upstream lift. Each foil may be coupled to and extend from the riser and may redirect flow of a fluid (e.g., a current) across a face of the foil to generate a lift in the riser. In some embodiments, the directionality of the foils may alternate so that the resultant lift induced by the foils is upstream (e.g., opposite the flow of the current).

Figure 1:
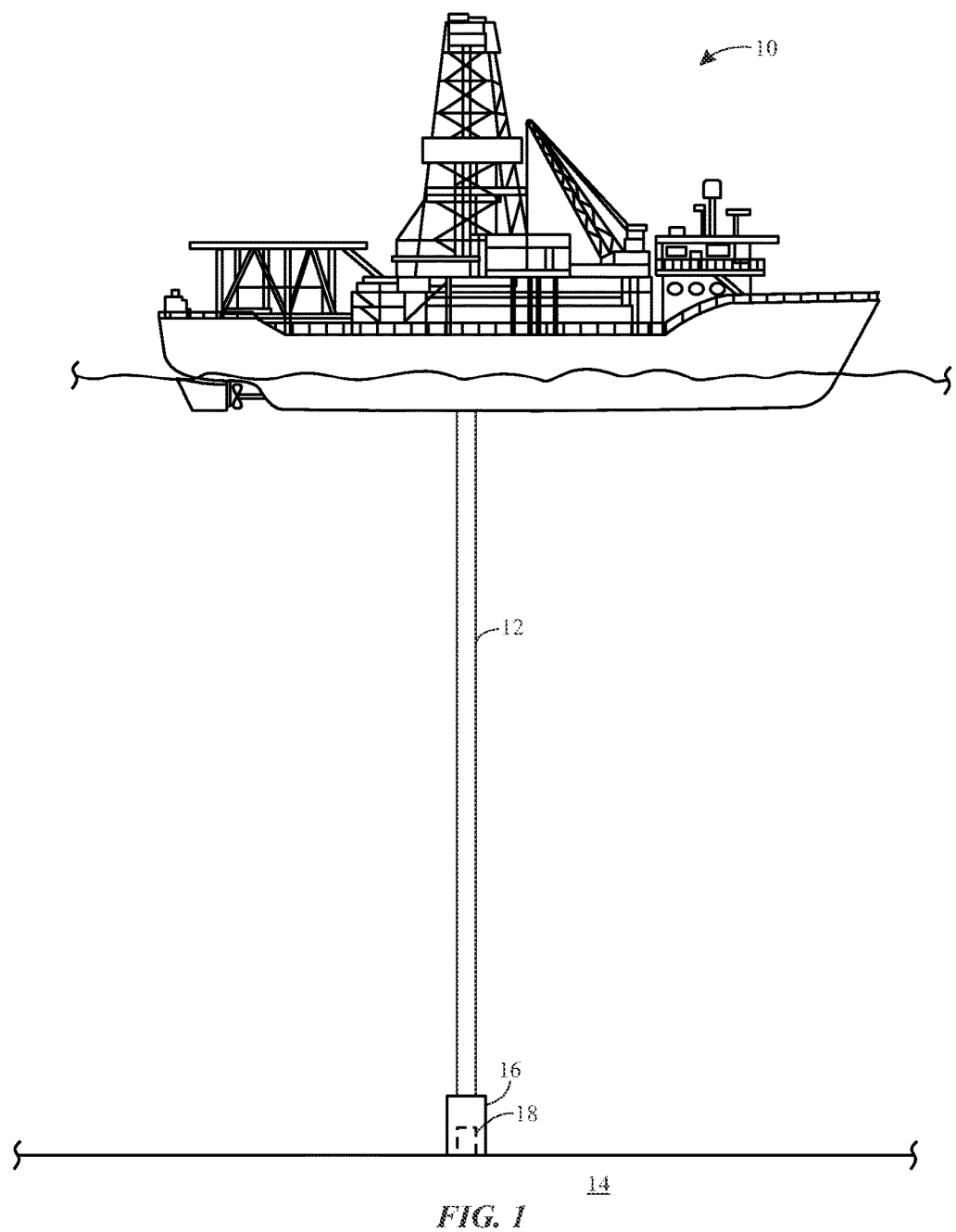
FIG. 1 illustrates an example of an offshore platform having a riser, in accordance with an embodiment.

With the foregoing in mind, FIG. 1 illustrates an offshore platform comprising a drillship 10. Although the presently illustrated embodiment of an offshore platform is a drillship 10 (e.g., a ship equipped with a drill rig and engaged in offshore oil and gas exploration and/or well maintenance or completion work including, but not limited to, casing and tubing installation, subsea tree installations, and well capping), other offshore platforms such as a semi-submersible platform, a floating production system, or the like may be substituted for the drillship 10. Indeed, while the techniques and systems described below are described in conjunction with drillship 10, the stabilization techniques and systems are intended to cover at least the additional offshore platforms described above.

As illustrated in FIG. 1, the drillship 10 includes a riser 12 extending therefrom. The riser 12 may include a pipe or a series of pipes that connect the drillship 10 to the seafloor 14 via, for example, blow out preventer (BOP) 16 that is coupled to a wellhead 18 on the seafloor 14. In some embodiments, the riser 12 may transport produced hydrocarbons and/or production materials between the drillship 10 and the wellhead 18, while the BOP 16 may include at least one valve with a sealing element to control wellbore fluid flows. In some embodiments, the riser 12 may pass through an opening (e.g., a moonpool) in the drillship 10 and may be coupled to drilling equipment of the drillship 10. As illustrated in FIG. 1, it may be desirable to have the riser 12 positioned in a vertical orientation between the wellhead 18 and the drillship 10. However, external factors (e.g., environmental factors such as currents) may disturb the vertical orientation of the riser 12.

Figure 2:
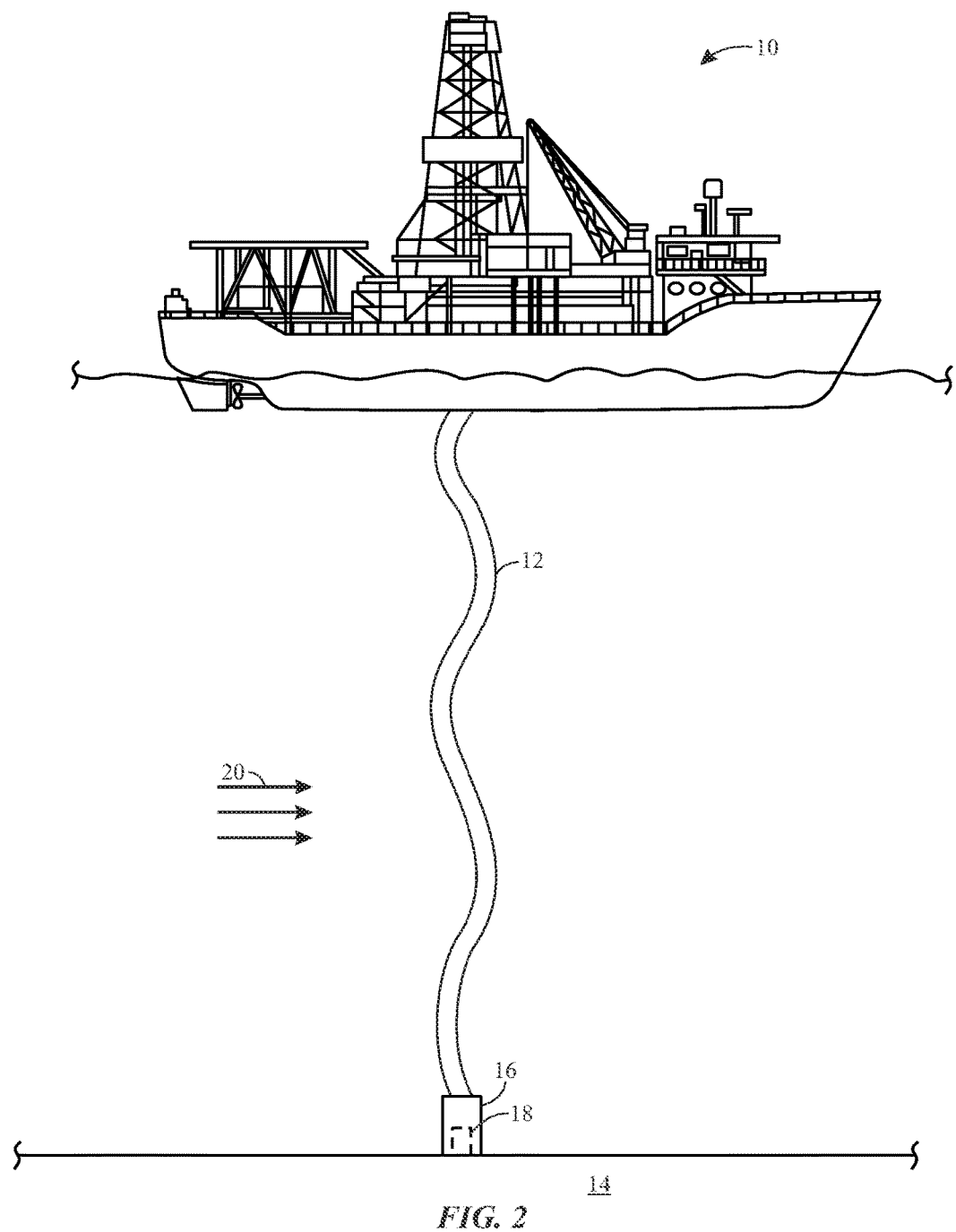
FIG. 2 illustrates an example of the offshore platform of FIG. 1 having a riser experiencing deflection, in accordance with an embodiment.

As illustrated in FIG. 2, the riser 12 may experience deflection, for example, from currents 20. These currents 20 may apply up to and in excess of 100 pounds of force per foot on the riser 12, which causes deflection (e.g., motion, bending, or the like) in riser 12. In some embodiments, this force applied to the riser 12 may cause the riser 12 to contact the edge of the moonpool of the drillship 10. Additionally and/or alternatively, the force applied to the riser 12 from the currents 20 (or other environmental forces) other may cause the riser 12 to stress the BOP 16 or cause key seating, as the angle that the riser 12 contacts the BOP 16 may be affected via the deflection of the riser 12. To reduce the deflection of the riser 12, and to reduce the chances of occurrence of the aforementioned problems caused by riser 12 deflection, one or more systems and techniques may be employed.

Figure 3:
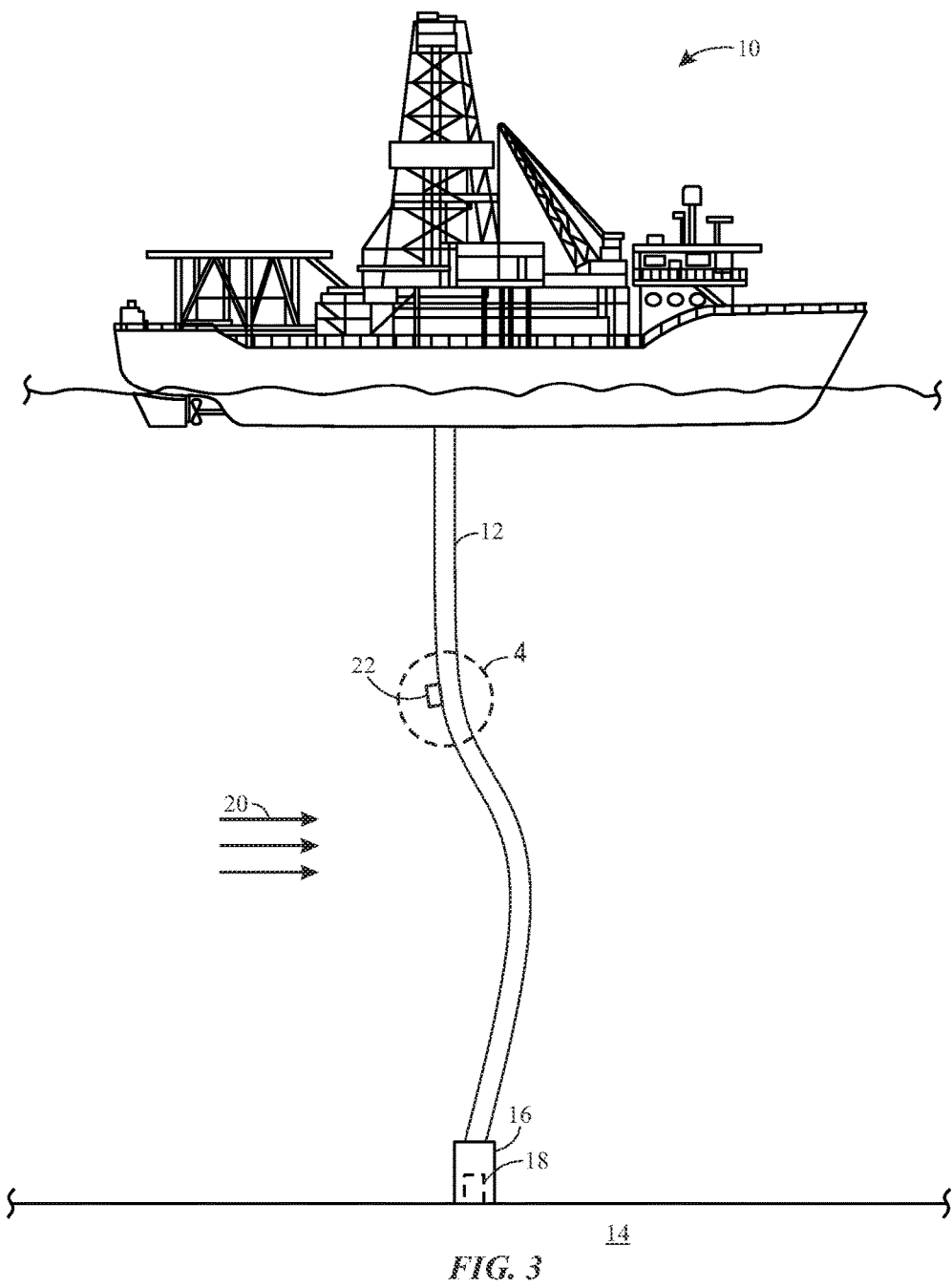
FIG. 3 illustrates a first embodiment of a system to mitigate the deflection of the riser of FIG. 2, in accordance with an embodiment.

FIG. 3 illustrates an embodiment of a system to mitigate deflection of the riser 12. As illustrated, FIG. 3 includes a current deflector 22 that may be coupled to the riser 12. In one embodiment, the current deflector 22 may include one or more foils (e.g., blades, wings, or the like) that may be utilized to achieve upstream lift to counteract the forces exerted on the riser 12 from currents 20. The current deflector 22 is shown in greater detail in FIG. 4.

Figure 4:
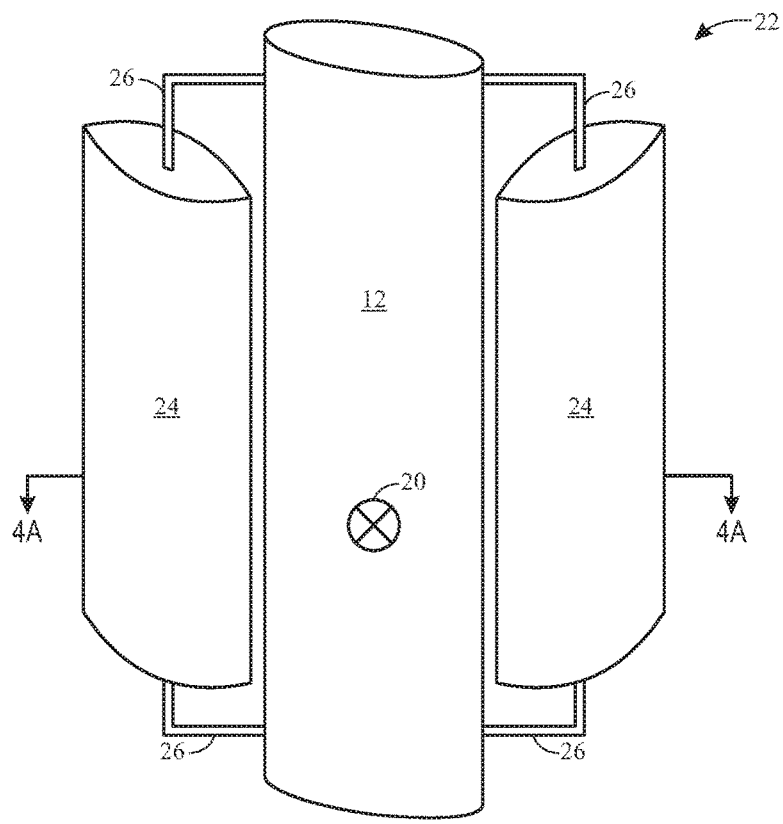
FIG. 4 illustrates a portion of the system of FIG. 3 identified by arrows 4, in accordance with an embodiment.
Figure 4A:
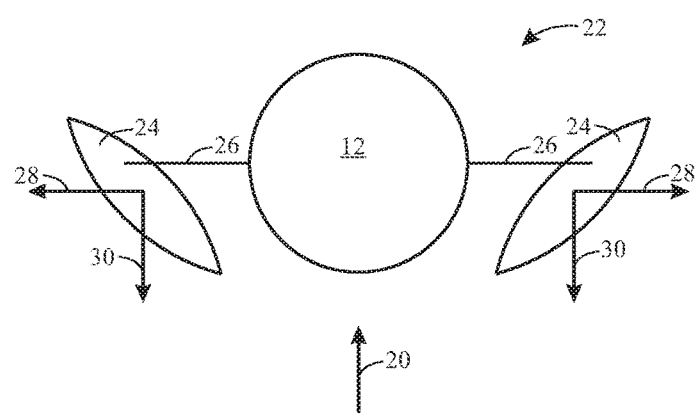
FIG. 4A illustrates a top view of the portion of the system of FIG. 9 identified by arrows 9A, in accordance with an embodiment.

FIG. 4 illustrates current deflector 22, and includes two foils 24. As illustrated, the foils 24 stand out from the riser 12 (e.g., each of the foils 24 is coupled to the riser 12 by a strut 26), and each foil 24 may generate lift of the riser 12 by redirecting flow of a fluid (e.g. currents 20) across the face of foils 24. For example, as illustrated in FIG. 4, the currents 20 flow in a direction into the riser 12 and the positioning of the foils 24 generate lift in an opposite direction to the flow of the currents 20. As additionally illustrated in FIG. 4A, the foils 24 are directionally opposed with respect to the riser 12 in a horizontal direction orthogonal to the direction of the currents 20 such that any forces 28 generated by the foils 24 in the horizontal direction are directly opposite (e.g., cancel one another out), resulting in upstream lift 30 generated by the foils 24.

Additionally, in some embodiments, strings of current deflectors 22 (e.g., multiple sets of current deflectors 22) may be utilized along the riser 12 and may, as illustrated in FIG. 4, have their respective foils 24 disposed at approximately the same vertical position relative to the riser 12. Alternatively, one or more current deflectors 22 disposed on the riser 12 may have their foils 24 disposed in a staggered position from one another along a vertical portion of the riser 12. In this embodiment, the foils 24 may still be directionally opposed with respect to the riser 12 in a horizontal direction such that the generated resultant lift (e.g., upstream lift 30) of the staggered foils 24 counteracts the currents 20.

The location of the one or more current deflectors 22 along riser 12 may be at predetermined or calculated locations. In some embodiments, charts may be developed based on measurements of the currents 20 at a particular drill site. Table 1 illustrates an example of such a chart:

TABLE 1

| Depth (ft) | 1 yr | 10 yr |
| --- | --- | --- |
| 0 | 5.3 | 5.9 |
| 164 | 4.3 | 4.7 |
| 328 | 3.8 | 4.2 |
| 459 | 3.3 | 3.6 |
| 755 | 2.0 | 2.2 |
| 1115 | 1.6 | 2.1 |
| 1362 | 1.6 | 2.0 |
| 1788 | 1.2 | 1.3 |
| 2100 | 1.2 | 1.6 |
| 2461 | 1.5 | 2.3 |
| 3002 | 2.0 | 2.2 |
| 3412 | 2.0 | 2.9 |
| 4577 | 0.0 | 0.0 |

Table 1 describes the speed of currents 20 at particular depths over periods of time, for example, one year and ten years. Using this information, a determination of the location (e.g., depth) and/or positioning of the one or more current deflectors 22 can be made. Once this determination is made, disposing the one or more current deflectors 22 may occur. However, it may be appreciated that other information separate from or in addition to the information of Table 1 may be used in determining a location and/or number of the one or more current deflectors 22.

In some embodiments, the one or more current deflectors 22 may be disposed directly onto a riser 12 prior the riser 12 being lowered into the sea (e.g., on the drillship 10 while the riser 12 is being made up). In some embodiments, the one or more current deflectors 22 may be attachable via fasteners (e.g., screws, bolts, or the like) or locking mechanisms (e.g., pins or the like) to any riser 12 or the riser 12 may be premade with any current deflectors 22 attached thereto (e.g., welded thereto).

In other embodiments, the one or more current deflectors 22 may be affixed to separate joints, such as a pup joint (e.g., drill pipe of a predetermined length used to adjust the length of the drill string/riser). For example, the one or more current deflectors 22 may be may be attachable via fasteners (e.g., screws, bolts, or the like) or locking mechanisms (e.g., pins or the like) to the pup joint or the pup joint may be premade with the one or more current deflectors 22 attached (e.g., welded) thereto. In this manner, the one or more current deflectors 22 may be attached to a selectable position of the riser 12 while still utilizing standardized riser joints.

Alternatively, the one or more current deflectors 22 may be affixed to the riser 12 or a pup joint once disposed in the sea (e.g., once the riser 12 is deployed). For example, a Remotely Operated Vehicles (ROV) may be utilized to affix the one or more current deflectors 22 to the riser 12 or pup joint in step 66. An ROV may be a remotely controllable robot/submersible vessel with that may be controlled from the drillship 10. The ROV may move to a selected point in the riser 12 and may couple a current deflector to the riser 12 at the position determined above. In some embodiments, one or more current deflectors 22 may be, at separate points, affixed to the riser 12 and/or a pup joint either during make up of the riser 12 or once the riser 12 is deployed.

This written description uses examples to disclose the above description, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Accordingly, while the above disclosed embodiments may be susceptible to various modifications and alternative forms, specific embodiments have been shown by way of example in the drawings and have been described in detail herein. However, it should be understood that the embodiments are not intended to be limited to the particular forms disclosed. Rather, the disclosed embodiment are to cover all modifications, equivalents, and alternatives falling within the spirit and scope of the embodiments as defined by the following appended claims.

What is claimed is:

1. A device, comprising:
    a foil configured to be coupled to a riser of an offshore vessel and configured to generate an upstream lift on the riser of the offshore vessel in response to a fluid flowing across the foil to counteract a force exerted on the riser of the offshore vessel due to flow of the fluid; and
    a second foil configured to be coupled to the riser, wherein the foil and the second foil are configured to weathervane about respective axes parallel to a longitudinal axis of the riser.

2. The device of claim 1, comprising a strut coupled to the foil.

3. The device of claim 2, wherein the strut is configured to couple the foil to a portion of the riser.

4. The device of claim 3, comprising a fastener configured to couple the strut to the portion of the riser.

5. The device of claim 3, comprising a second strut coupled to the foil, wherein the second strut is configured to couple the foil to the portion of the riser.

6. The device of claim 3, wherein the portion of the riser is a riser joint.

7. The device of claim 3, wherein the portion of the riser is a pup joint.

8. The device of claim 1, wherein the foil and the second foil are configured to be directionally opposed with respect to the riser of the offshore vessel in a horizontal direction orthogonal to the direction of the flow of the fluid.

9. A method, comprising:
    disposing a foil on a portion of a riser of an offshore vessel to generate an upstream lift on the riser of the offshore vessel in response to a fluid flowing across the foil to counteract a force exerted on the riser of the offshore vessel due to flow of the fluid; and
    disposing a second foil on the riser, wherein the foil and the second foil are configured to weathervane about respective axes parallel to a longitudinal axis of the riser.

10. The method of claim 9, comprising disposing the foil on a riser joint as the portion of the riser of the offshore vessel.

11. The method of claim 9, comprising disposing the foil on a pup joint as the portion of the riser of the offshore vessel.

12. The method of claim 9, comprising disposing the foil on the portion of the riser of the offshore vessel prior the portion of the riser being lowered into a body of water.

13. The method of claim 9, comprising disposing the foil on the portion of the riser of the offshore vessel subsequent to the portion of the riser being lowered into a body of water.

14. The method of claim 9, comprising disposing the second foil on the portion of the riser of the offshore vessel at a common vertical position with the first foil.

15. The method of claim 9, comprising disposing the second foil on the portion of the riser of the offshore vessel at a staggered vertical position with the first foil.

16. The method of claim 9, comprising disposing the second foil on a second portion of the riser of the offshore vessel at staggered vertical position with the first foil.

17. The method of claim 9, comprising determining where to dispose the foil based upon a speed of the flow of the fluid at a particular depth from the offshore vessel.

18. The method of claim 9, comprising determining where to dispose the second foil on the riser based upon a speed of the flow of the fluid at a second particular depth from the offshore vessel.

19. A system, comprising:
    a segment of a riser of an offshore vessel;
    a current deflector coupled to the segment of the riser of the offshore vessel, wherein the current deflector is configured to generate a lift on the riser in response to a fluid flowing across the current deflector; and
    a second current deflector coupled to the segment of the riser, wherein the current deflector and the second current deflector are configured to weathervane about respective axes parallel to a longitudinal axis of the segment of the riser.

20. The system of claim 19, wherein the second current deflector is configured to be directionally opposed with the current deflector with respect to the riser in a horizontal direction orthogonal to the direction of flow of the fluid.

* * * * *